(12) United States Patent
Khayrallah et al.

(10) Patent No.: US 6,711,124 B2
(45) Date of Patent: Mar. 23, 2004

(54) TIME INTERVAL BASED CHANNEL ESTIMATION WITH TRANSMIT DIVERSITY

(75) Inventors: Ali S. Khayrallah, Apex, NC (US); Dennis Hui, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 276 days.

(21) Appl. No.: 09/866,241

(22) Filed: May 25, 2001

(65) Prior Publication Data

US 2003/0016637 A1 Jan. 23, 2003

(51) Int. Cl.[7] .................................................. H04Q 7/00
(52) U.S. Cl. ........................ 370/208; 370/345; 375/347
(58) Field of Search ............................... 370/328, 329, 370/334, 335, 336, 337, 342, 345, 347, 203, 208; 375/295, 299, 316, 347, 349; 455/60, 101, 132, 272, 273

(56) References Cited

U.S. PATENT DOCUMENTS 5,793,759 A * 8/1998 Rakib et al. ................ 370/342
6,038,263 A * 3/2000 Kotzin et al. ............... 375/299
6,088,408 A * 7/2000 Calderbank et al. ........ 375/347
6,185,258 B1 * 2/2001 Alamouti et al. ........... 375/260

FOREIGN PATENT DOCUMENTS

EP  0449327 A2  10/1991
EP  1128575 A1  8/2001

* cited by examiner

Primary Examiner—Kwang Bin Yao
(74) Attorney, Agent, or Firm—Coats & Bennett, P.L.L.C.

(57) ABSTRACT

A wireless communication system with transmit diversity scales a training sequence simultaneously transmitted by two or more antennas over two or more time intervals in a manner that allows a receiver to perform channel estimation relative to each antenna. The transmit signal is scaled at each antenna in each time interval by a corresponding scaling value selected from a set of orthogonal scaling values. The receiver develops a channel estimate for each of the time intervals as if there were only one antenna transmitting the training sequence. These channel estimates are then summed or combined for each transmit antenna, using values from the corresponding scaling value matrix column. The orthogonality between scaling value sequences used between the multiple transmit antennas allows the receiver to distinguish the training sequence as received from the individual transmit antennas, and to thus perform channel estimation with respect to each transmit antenna.

40 Claims, 7 Drawing Sheets

$$\begin{array}{c|cccc}
 & A_1 \mid A_2 \mid \cdots \mid A_N \\
\hline
TS_1 & b_{11} & b_{12} & \cdots & b_{1N} \\
TS_2 & b_{21} & b_{22} & \cdots & b_{2N} \\
\vdots & \vdots & \vdots & \ddots & \vdots \\
TS_M & b_{M1} & b_{M2} & \cdots & b_{MN}
\end{array}$$

M x N MATRIX
(ORTHOGONAL COLUMNS)

TIME INTERVAL BASED CHANNEL ESTIMATION WITH TRANSMIT DIVERSITY

BACKGROUND OF THE INVENTION

The present invention relates generally to wireless communication systems and particularly relates to channel estimation in wireless communication systems that employ transmitter diversity.

Reliability represents a critical measurement in assessing the performance of any communication system, including the many types of wireless communication systems in use today. In wireless environments, achieving reliable communication requires overcoming the many challenges associated with non-ideal reception conditions, and particularly with overcoming or compensating for changing channel characteristics.

With the complex encoding and wide band channels employed by some types of wireless communication systems, successful signal reception and information recovery often depends on effective channel equalization wherein a receiver compensates a received signal for the characteristics of the channel through which it was received. Channel equalization reduces block or bit error rates in the received signal to acceptable levels and, indeed, permits successful communication under channel conditions that would otherwise prevent reliable communication.

Channel equalization requires that the receiver "learn" the characteristics for the reception channel, which is generally taken to be the signal path between the transmitter and the receiver. In blind estimation techniques, the receiver determines the channel characteristics based on decoding information from the received signal without benefit of a priori knowledge of the transmitted information. Training may be somewhat simplified and improved, where possible, by transmitting a known sequence during a portion of the received signal. Channel estimation is simplified in this scenario in as much as the receiver knows what sequence of values it should have received during the training portion of the received signal and can thus compare what it actually received with what it should have received.

Another problem of significant concern in wireless communication systems is channel fading. When there is relative motion between the transmitter and receiver, the radio signal propagation path changes as the nature and position of obstructions between them changes. This causes abrupt changes in received signal strength, and can result in a complete loss of the received signal under extreme fading conditions. Transmit signal diversity, wherein two or more antennas transmit the same information signal, represents one approach to combating fading problems. With multiple transmit antennas there is a greater likelihood that at least one of the transmitted signals from the multiple antennas will not be completely faded, thus allowing successful signal reception at the receiver.

However, transmit diversity complicates received signal equalization because the receiver must develop accurate channel estimates for each transmit path or channel. One approach to this task involves transmitting separate training sequences from each transmit antenna. To facilitate estimation of these multiple channel responses at the receiver, the different training sequences transmitted from the multiple antennas must have good auto- and cross-correlation properties. Finding an adequate number of training sequences with the requisite correlation qualities is difficult at best, owing to the limited length of the training sequences that can be used and the limited "alphabet" from which distinct training values may be formed. The difficulty in finding suitable training sequences increases with the number of transmit antennas used.

BRIEF SUMMARY OF THE INVENTION

A wireless communication system employing transmit diversity uses multiple time intervals or slots in a wireless communication system to perform channel estimation between multiple transmit antennas and a given receiver using a single training sequence. Rather than using a potentially difficult-to-find set of distinct training sequences, one for each transmit antenna, each transmit antenna broadcasts the same training sequence, but scaled and signed in each time interval according to a corresponding value in a scaling value matrix. The receiver performs basic channel estimation in each of the time intervals as if there were only one transmit antenna. A channel estimate for each transmit antenna may then be determined at the receiver by properly combining the channel estimates obtained across all time intervals.

The scaling value matrix is defined where each column corresponds to a particular one of the multiple transmit antennas, and where the rows correspond to successive time intervals. The column values are defined such that each column is orthogonal with respect to all other columns. Thus, the $j^{th}$ antenna at the $k^{th}$ time interval or slot transmits the training sequence scaled by the matrix element $b_{kj}$. At the receiver, a combined channel estimate is developed for each received signal time slot as if there were only one transmit antenna. The receiver then sums the combined estimates for each antenna based on the same scaling value matrix used to scale the transmit signal. This estimate may itself comprise a set of estimates corresponding to multipath signal components from each of the antennas. The orthogonal properties of the scaling value matrix allows the receiver to cancel signal interference from the other transmit antennas when combining the composite channel estimates for individual ones of the transmit antennas.

DETAILED DESCRIPTION OF THE INVENTION

The following discussion includes, in certain specific examples, details that are based on the Global Services for Mobile Communications, but the present invention is broadly applicable to both Time Division Multiple Access (TDMA) and Code Division Multiple Access (CDMA)

communication systems. Thus, it should be understood that specific details and examples are for explaining various aspects of the invention and should not be construed as limiting the scope of the present invention.

Figure 1:
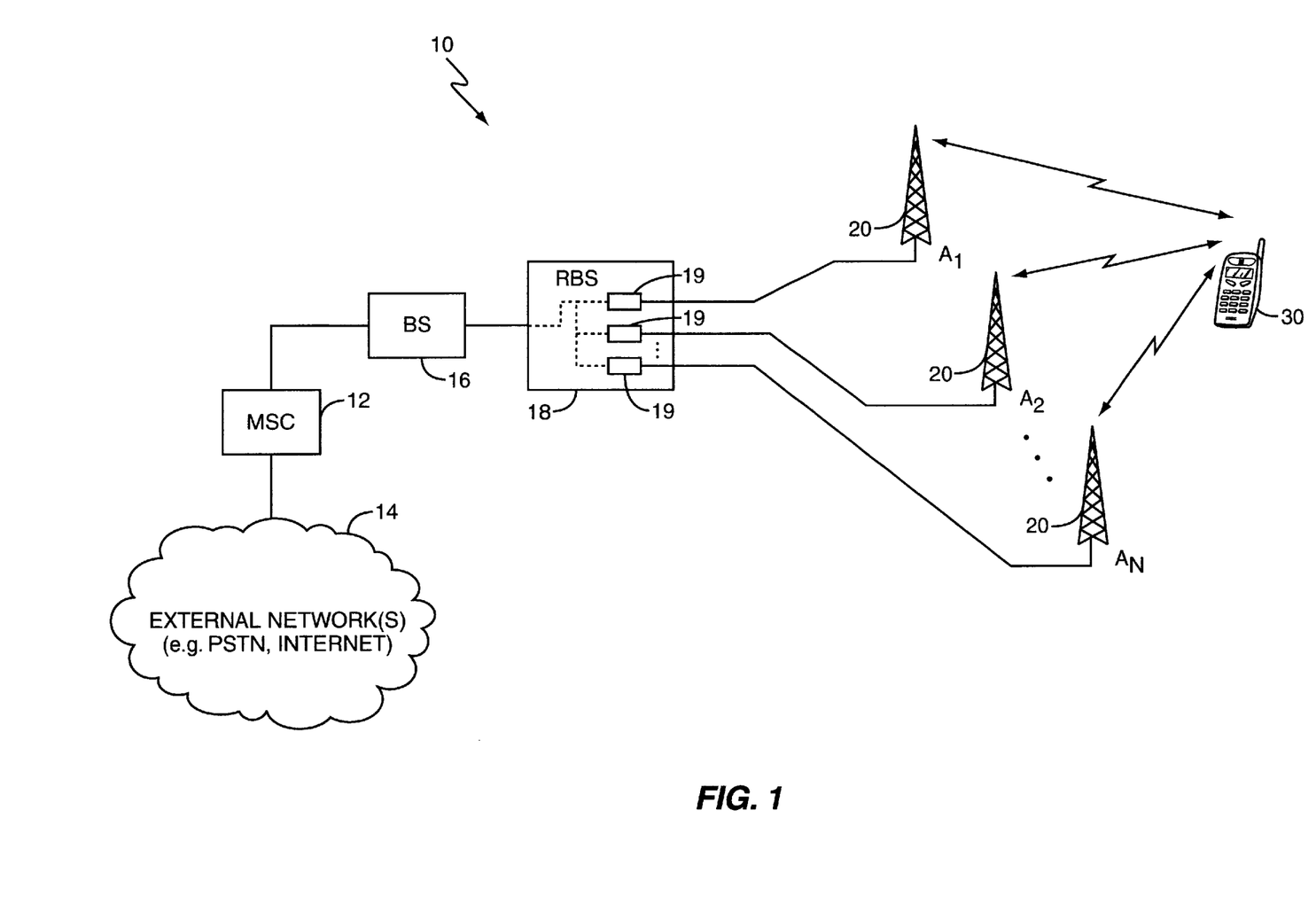
FIG. 1 is a diagram of a wireless mobile network with transmit diversity.

Turning now to the drawings, FIG. 1 illustrates a wireless mobile communication network generally referred to by the numeral 10. The mobile network 10 includes a mobile switching center (MSC) 12 to interface with one or more external networks 14, a base station controller (BSC) 16, a radio base station (RBS) 18 with multiple transmit amplifiers 19 and associated antennas 20, and a plurality of wireless access terminals (ATs) 30. Note that the multiple transmit antennas may be arranged on a common mast or tower in some implementations.

In actual implementation, the mobile network 10 typically includes one or more MSCs 12, and multiple BSCs 16, each one supporting one or more RBSs 18, as well as other network elements, such as home and visitor location registers (not shown).

The mobile network 10 permits a user of the AT 30 to communicate with other AT users, and with users of the one or more external networks 14. These external networks may include but are not limited to the Public Switched Telephone Network (PSTN) and the Internet. The BSC 16 provides call traffic and control signaling to each of the RBSs 18, as well as providing a communication interface to the MSC 12, which acts a gateway to the external networks 14. The RBS 18 provides RF resources, (e.g., modulators, demodulators, etc.) for sending and receiving data and control information via RF signaling to each of the ATs 30 that are active within service area covered by the set of antennas 20.

The set of antennas 20 (e.g., $A_1, A_2, \ldots A_N$) are used to achieve transmit diversity from the perspective of the AT 30. The information to be conveyed to the AT 30 is mapped into N possibly distinct signals to be transmitted from $A_1, \ldots, A_N$. This is done in the interest of overcoming potential multipath fading problems that occur over the physical medium. Essentially, having multiple transmit signals increases the likelihood that the AT 30 will always receive at least one of the transmit signals from at least one of the antennas 20. In short, the idea of transmit diversity involves having two or more physically separated transmit antennas 20 so that an obstruction or condition that prevents the AT 30 from receiving the transmit signal from one antenna 20 will not simultaneously prevent reception of the transmit signal from another antenna 20. In addition, the N signals can be designed such that they do not effectively cancel one another at the receiver (e.g., AT 30). That is, designed such that the effect of fading on the N different propagation channels from the N transmit antennas 20 to the AT 30 does not result in the signals adding in subtractive fashion at the AT 30.

There will be, in most cases, a defined total transmit power level for the transmit signals from the antennas 20 to the AT 30, so the transmit power from each of the antennas 20 is scaled by the number of antennas N. Thus, for periods when all of the N transmit antennas are simultaneously transmitting to the AT 30, the transmit power from each antenna 20 is, in general, 1/N. Dynamic transmit power adjustment is a common feature in most wireless communication systems, and may be accomplished here by proper configuration of each of the transmit amplifiers 19.

Figure 2:
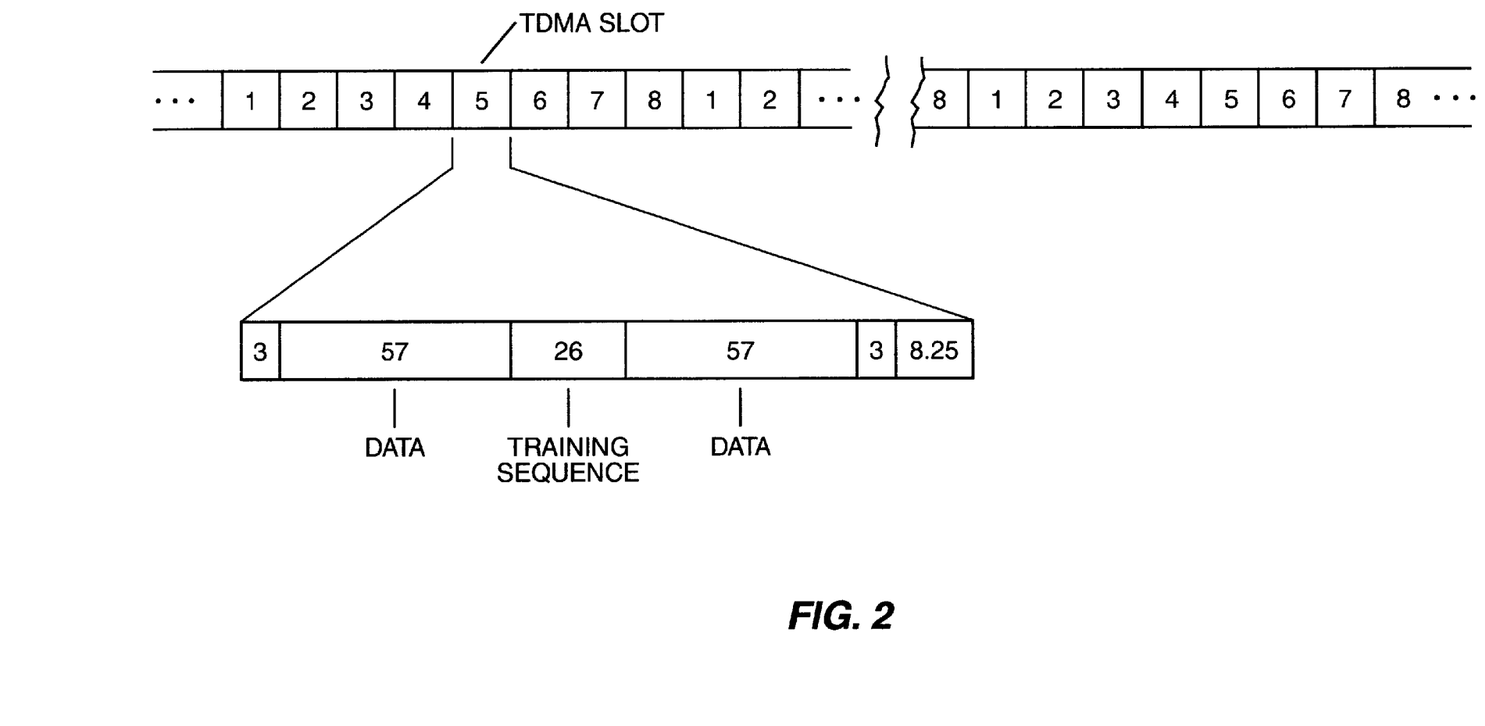
FIG. 2 is a diagram of a repeating time slot in a generalized TDMA signal.

In TDMA systems, multiple users are supported on a given transmit and receive frequency by defining sets or frames of repeating time slots, with one or more slots from each repeating frame assigned to a specific user. FIG. 2 is a simplified illustration of TDMA time slots in the context of a GSM system. Each time slot has a defined organization that includes both unknown information (control and data), as well as known information (e.g., training sequences), all in accordance with the synchronized frame/slot timing defined by the GSM standard.

As noted earlier, channel equalization refers to the technique of compensating a received signal for the distortions caused by radio path propagation. A given radio signal propagation path is termed a "channel." By compensating for the channel's phase shift and attenuation, the AT 30 can significantly improve its ability to recover data from the received signal. The training sequence portion of the slot data is a known sequence of 26 symbols that are used by the AT 30 to estimate the channel response. The estimated channel response is used to compensate the received signal for channel distortions. Channel equalization effectively applies a filter with a response that is matched to the channel of the received signal.

With transmit diversity, multiple transmit antennas 20 broadcast simultaneously. The AT 30 receives signals from the multiple antennas 20 simultaneously, making the task of discriminating training sequence information received from the various antennas difficult. A typical wireless communication system with transmit diversity transmits a different training sequence from each one of its multiple transmit antennas. Finding a set of training sequences with sufficiently good auto- and cross-correlation properties is difficult, and becomes increasingly difficult as the number of transmit antennas increases. Also, introducing new training sequences creates incompatibilities between transmit diversity and non-transmit diversity modes. Since both modes must co-exist in typical wireless communication system, new sequences are best avoided if possible.

The present invention uses a single training sequence with good auto-correlation properties, and transmits this single training sequence from each of the multiple transmit antennas 20. The complexity of determining a single training sequence with suitable autocorrelation performance is substantially less complex than finding a set of training sequences. However, the use of single training sequence requires transmission and reception techniques that permit channel estimation for each of the antennas 20 at the AT 30. The present invention uses a scaling value matrix, or other appropriate set of scaling values to accomplish this.

First, consider the case of two transmit antennas 20 and two consecutive time slots. Later, the more general case of N transmit antennas 20 and M time slots follows in a straightforward manner.

In a first example, a training sequence is transmitted simultaneously from the two antennas 20 in a first time slot. In the second time slot, a training sequence is transmitted from the first one of the two antennas 20, while the antipodal sequence (i.e., the same sequence multiplied by −1) is simultaneously transmitted from the second one of the two antennas 20.

From the perspective of the AT 30, the effect of transmitting the same training sequence in the first time slot is that it can estimate a channel equivalent to the sum of the two channels. Similarly, the effect of transmitting antipodal sequences in the second time slot is that the AT 30 can estimate a channel equivalent to the difference between the two channels. The sum and the difference may then be used to separate the individual channels, allowing the AT 30 to estimate each channel.

In a second example, a training sequence is transmitted from a first one of two antennas 20 in the first time slot, with no signal being transmitted by the second one. In the second time slot, the second one of the two antennas 20 transmits a training sequence, with no signal being transmitted by the first one.

In this case, a receiver (e.g., the AT 30) can estimate the channel from the first one of the antennas 20 in the first time slot, and the channel from the second one of the antennas in the second time slot. Note that if the total transmit power is P when simultaneously transmitting from both the first and second antennas 20, then each antenna 20 nominally transmits at power P/2. Thus, in this second example, in order to allocate the appropriate amount of power to the training for each channel, the nominal transmit power from the first antenna 20 is doubled when transmitting the training sequence in the first time slot. Likewise, the nominal transmit power from the second antenna 20 is doubled when transmitting the training sequence in the second time slot.

Figure 3:
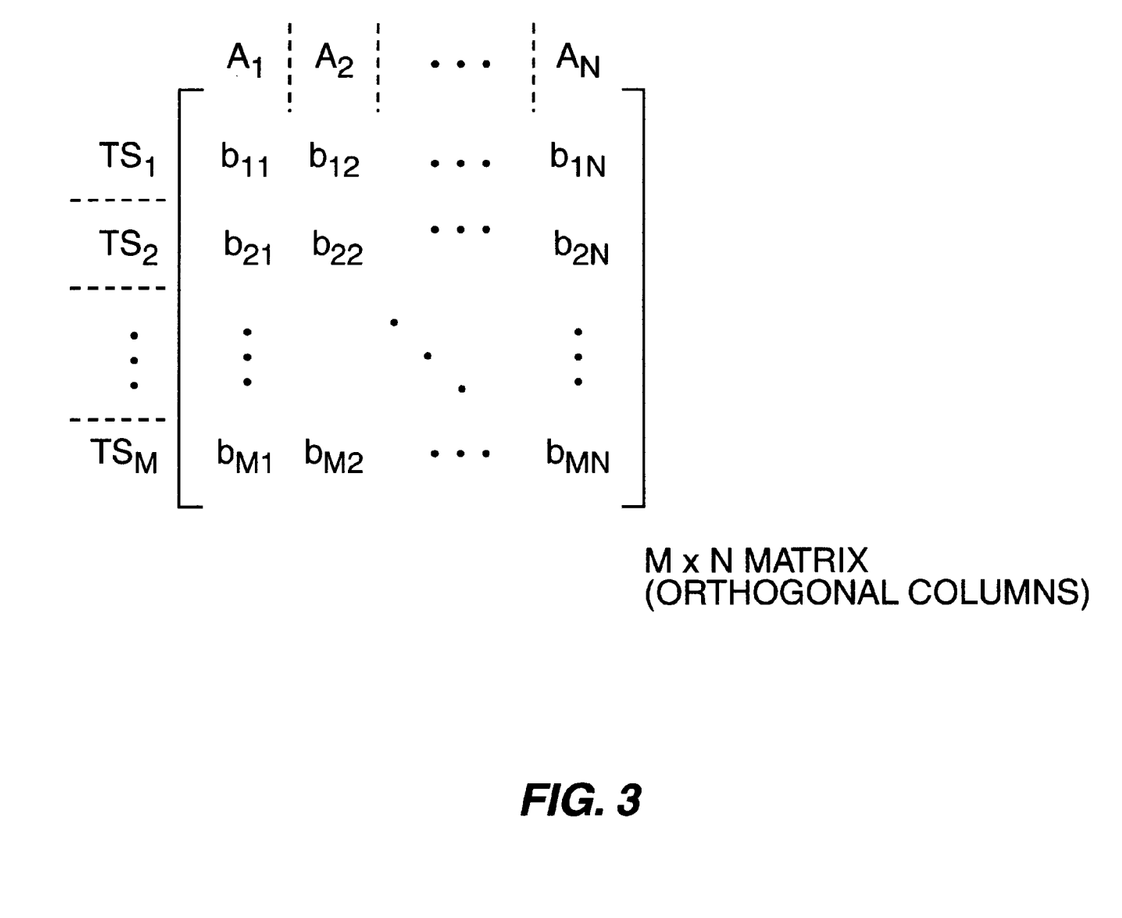
FIG. 3 is a diagram of a transmit diversity scaling value matrix used in the present invention.

Turning to the general formulation of N antennas 20 and M time slots, FIG. 3 illustrates a generalized scaling value matrix. The matrix has N columns corresponding to N transmit antennas 20. That is, column 1 corresponds to antenna $A_1$, while column 2 corresponds to antenna $A_2$, and so on. Each row corresponds to a successive time slot in the TDMA transmit signal that is assigned to the AT 30. While the scaling value matrix rows do not necessarily represent consecutive time slots (e.g., frame 1, frame 2, frame 3, etc.), this is ordinarily the case. Each element of the scaling value matrix comprises a scaling factor or scaling value that is used to scale the transmit power level of the training sequence as will be hereinafter described. Note that, in general, scaling values may be complex values.

The scaling value matrix is dimensioned as M rows by N columns, indicating that M successive time slots will be used to develop channel estimates for all of the N antennas 20. While M must be at least as large as N (M≧N), there may be more time slots than antennas 20. For example, one might train for four antennas 20 over eight time slots. Using a greater number of time slots yields better channel estimates through averaging only if the channels themselves are not changing too rapidly.

Each row/column position in the matrix holds a scaling value for a corresponding one of the N transmit antennas 20, for a corresponding one of the M time slots. That is, the matrix element in the $k^{th}$ row and the $j^{th}$ column represents the scaling value used to scale the transmit signal power and set the signal sign (positive or negative) for the training sequence portion of the transmit signal from the $j^{th}$ antenna 20 during the $k^{th}$ time slot. This scaling value is denoted as $b_{kj}$. As will be explained in more detail later, the orthogonality between the scaling value matrix columns allows the AT 30 to discriminate between the antennas 20.

Figure 4:
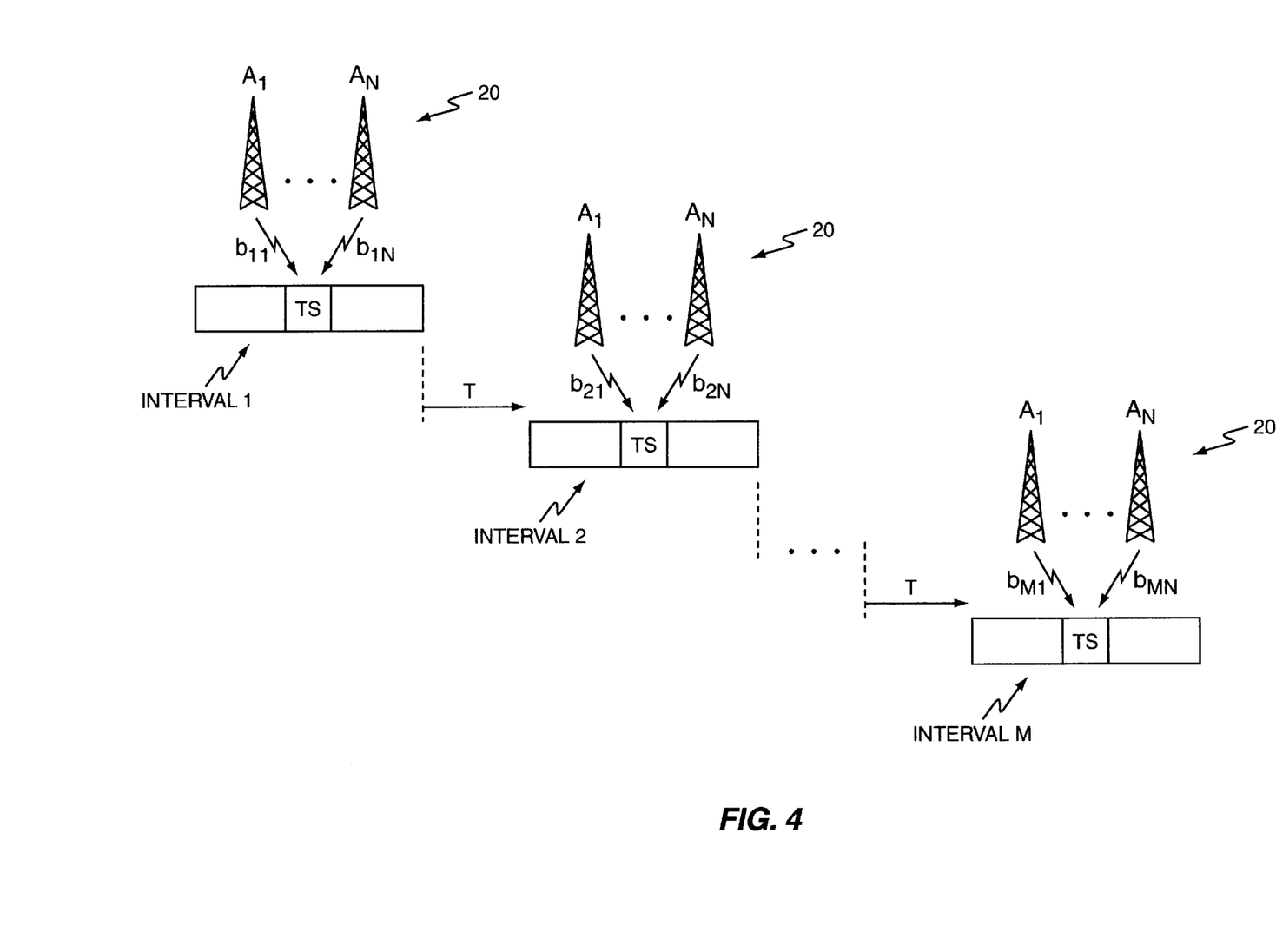
FIG. 4 is a diagram of training sequence scaling over successive TDMA time slots using elements from the scaling value matrix of FIG. 3.

FIG. 4 illustrates the process of transmitting the known training sequence over M time slots. During Slot 1, the transmit signal from antenna $A_1$ for at least the training sequence portion of the signal is scaled according to matrix element $b_{11}$, the signal from antenna $A_2$ is scaled according to matrix element $b_{12}$, and so on. At the next slot, the matrix elements (scaling values) from the second row are used, so matrix element $b_{21}$ scales the signal from antenna $A_1$, matrix element $b_{22}$ scales the signal from antenna $A_2$, and so on. This progresses for at least as many times slots as there are transmit antennas 20 (M≧N).

Figure 5:
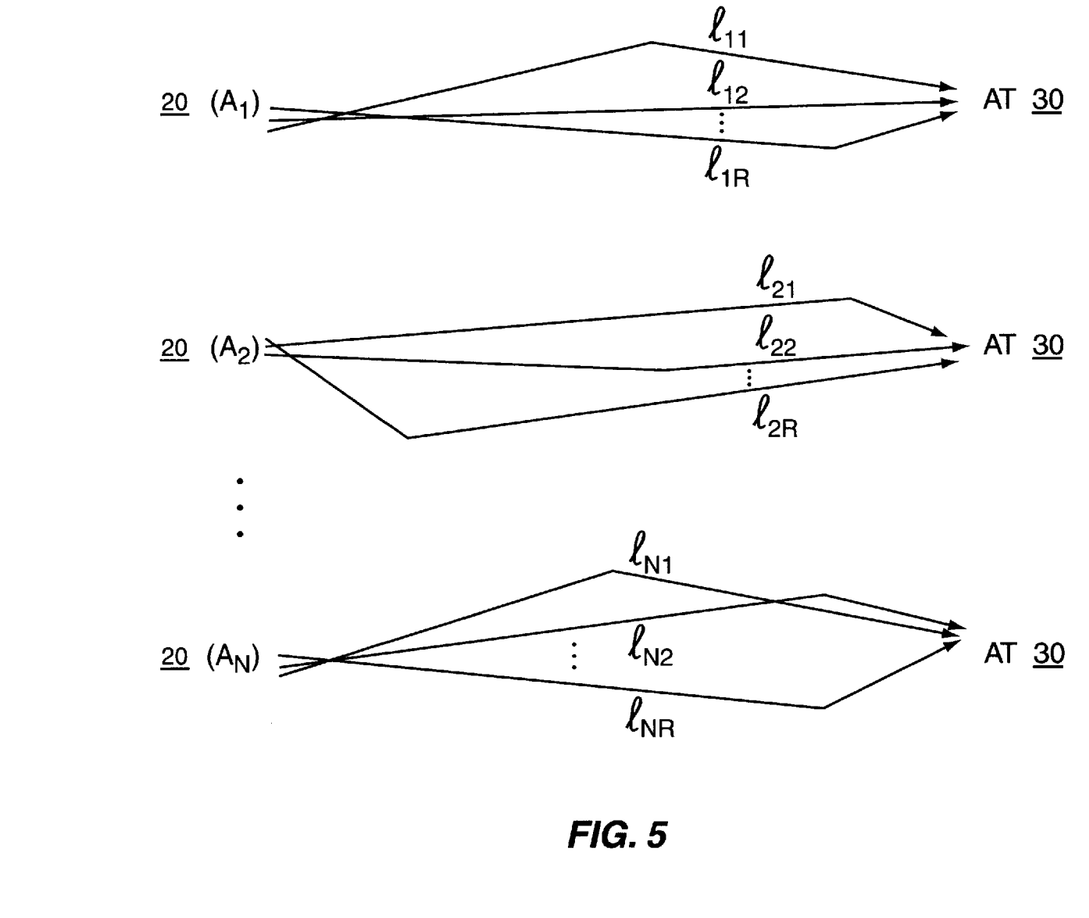
FIG. 5 is a diagram of exemplary multipath channels between the transmit antennas and the access terminal of FIG. 1.

FIG. 5 illustrates an additionally complexity in terms of signal reception from the perspective of the AT 30. From each antenna 20, there are multiple propagation paths (e.g., $l_0, l_2, \ldots l_{L \, 31 \, 1}$). This multipath phenomenon is well understood in the art. For the purposes of this discussion, then, the term "channel estimate" as used between the AT 30 and any one of the antennas 20 should be understood to refer to the set of propagation paths between the AT 30 and that antenna 20. A channel estimate $\hat{C}$ for a given one of the antennas 20 represents a set of channel estimates $\hat{h}$, with each estimate corresponding to one of the multipath signals from the antenna 20. Thus, the set of channel estimates for the $j^{th}$ antenna is expressed as, $$\hat{C}_j = \{\hat{h}_j(l)\}_{l=1}^{l=L}$$

Where $\hat{h}_j$ is the channel estimate for each multipath l for the jth antenna, with a total of L multipaths.

Figure 6:
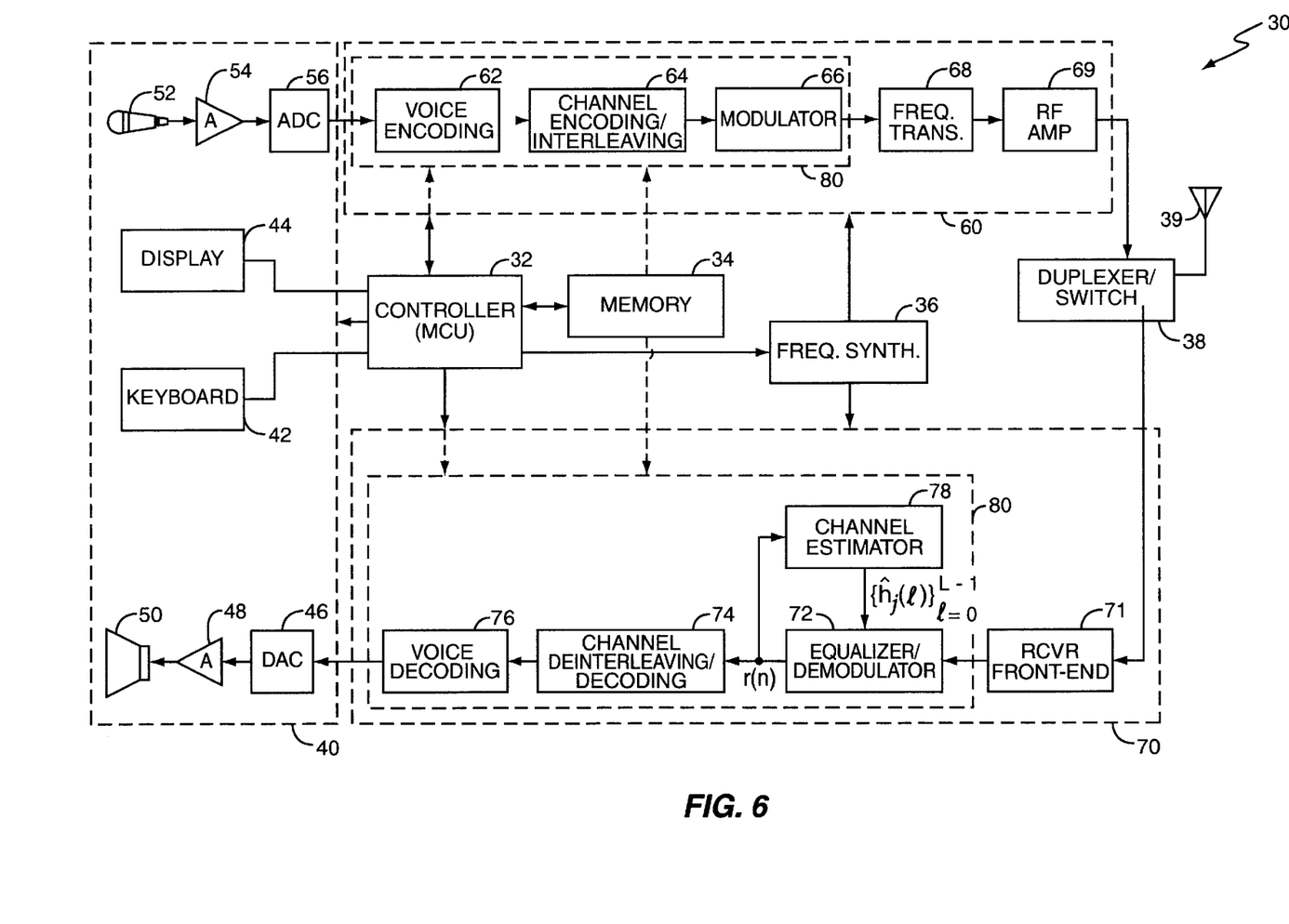
FIG. 6 is a diagram of an exemplary architecture for the access terminal of FIG. 1.

FIG. 6 is a diagram of an exemplary AT 30 in accordance with the present invention. The AT 30 comprises a controller 32, memory 34, a frequency synthesizer 36, an antenna assembly including duplexer/switch 38 and antenna 39, a user interface 40, a transmitter 60, and a receiver 70. As shown, the AT 30 supports voice and data communication as a digital cellular telephone. However, the present invention is applicable to essentially any type of wireless communication receiver required to generate channel estimates based on receiving known training data or information in a transmit diversity environment. Thus, the AT 30 is not limited to cellular handsets, and may be implemented as a pager, a personal digital assistant, a computer with RF communications, and the like.

The controller 32 typically comprises a microcontroller unit (MCU) that includes a microprocessor and supporting peripherals, such as timer/counters, pulse-width modulation circuits, memory, and bit-oriented input/output signal lines. Generally, the controller 32 acts as an overall system manager, handling various housekeeping chores, including management of the user interface 40.

The user interface 40 includes a keypad 42 and a display 44. The controller 32 interfaces either directly or indirectly with the keyboard 42 and display 44 to accept control and data input from the user, and to provide visual information, such as call status, email or short-message service text, address book information, and the like.

A digital-to-analog converter (DAC) 46 receives decoded digital speech samples from the receiver 70, and converts the samples into an analog output signal. The amplifier 48 amplifies the DAC output signal and drives a speaker 50, which provides audio output to the user.

A microphone 52 receives input speech from the user, which is converted into an analog electrical signal that is amplified by amplifier 54, and converted into digital samples by the analog-to-digital converter (ADC) 56. The digitized speech signals are then provided to the transmitter 60, where they are encoded for transmission to the base station 16 via the antenna 39.

The transmitter 60 comprises a voice encoder 62, which encodes the digitized voice samples received from the user interface 40. The encoded voice samples then pass to the channel encoder/interleaver, which adds redundancy encoding and interleaving to the speech data, as well as any control or signaling information from, for example, the controller 32. The modulator 66 uses the channel-encoded data to generate modulation signals, which are then used in the frequency translation stage 68 to modulate a carrier signal that is at the desired transmit frequency. The modulated carrier-frequency signal output by the frequency translation stage 68 is then amplified by the RF amplification stage 69 and broadcast by the antenna 39.

The receiver 70 comprises a receiver front-end that includes typically provides filtering, amplification, down conversion, and analog-to-digital conversion of the received signal, an equalizer/demodulator 72, a channel decoder/deinterleaver 74, a voice decoder 76, and a joint channel estimator 78. Selected portions of the transmitter 60 and receiver 70 may be combined into a digital signal processor (DSP) 80, which provides digital signal processing functions supporting the various transmit and receive operations, including voice and channel encoding/decoding operations.

In operation, the equalizer/demodulator 72 recovers symbol sequences corresponding to transmitted data from the received signal, after processing by the receiver front-end 71. The joint channel estimator 78 determines channel estimates for the propagation paths (channels) corresponding to each of the antennas 20. The equalizer/demodulator 72 compensates the received signal for channel distortions based on these channel estimates, thus improving its performance. Essentially, a channel estimate describes the phase shift and attenuation of a corresponding channel, allowing the receiver 70 to "correct" received signal sample values for channel distortion.

In the transmit diversity environment of the present invention, the joint channel estimator 78 must develop a channel estimate for each significant multipath channel corresponding to each one of the transmit antennas 20. This requires the receiver 70 to discriminate the training sequences it receives from one antenna 20 from those it receives from the others. To achieve this discrimination, the joint channel estimator 78 uses the same scaling value matrix used to transmit the received signal from the collection of antennas 20.

Figure 7:
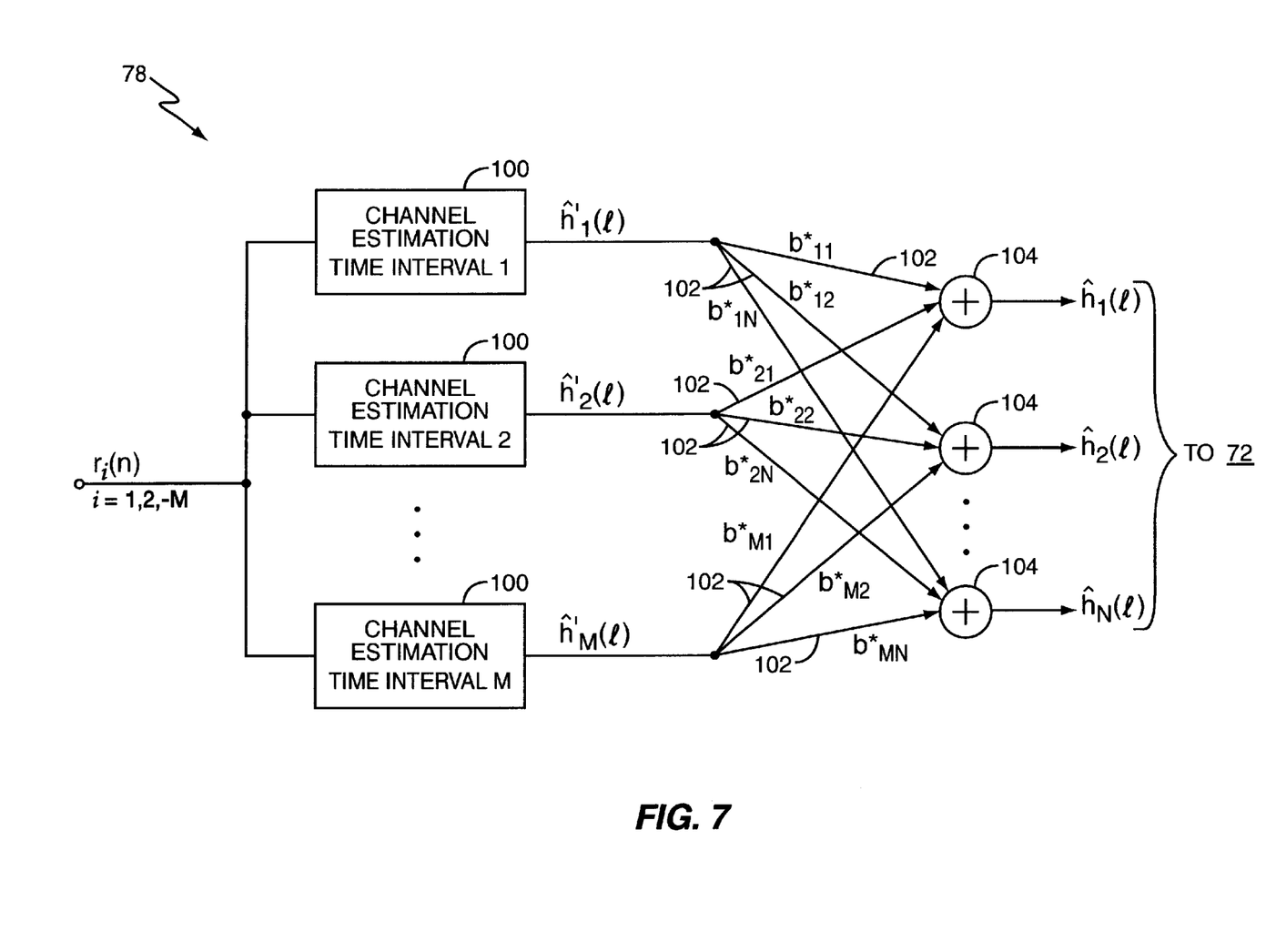
FIG. 7 is an exemplary diagram illustrating joint channel estimation in accordance with the present invention.

FIG. 7 illustrates an exemplary joint channel estimator 78 and provides a basis for detailing channel estimation operations in accordance with the present invention. The joint channel estimator 78 includes channel estimators 100, multipliers 102, and summing nodes or combiners 104. FIG. 7 illustrates a functional organization for the joint channel estimator 78, rather than necessarily describing a literal arrangement of discrete circuits. For example, the joint channel estimator 78 may be implemented as part of the DSP 80, in which case the illustrated functional blocks represent processing resources of the DSP 80 organized based on a software implementation of the required functions.

Functionally, the joint channel estimator 78 comprises an estimator 100 for each of the M time slots. In operation, each estimator 100 develops a combined channel estimate for one or more selected multipath signals representing the effective channel response for its corresponding time slot k. This is expressed as $$\{\hat{h}'_k(l)\}_{l=0}^{L-1},$$

where l represents a multipath signal. Thus, for M time slots or intervals, there are M combined channel estimates, each one containing estimates for at least one of up to L multipaths.

Essentially, each estimator 100 develops a channel estimate in its corresponding time interval k as if there were only one transmit antenna 20, rather than the two or more transmit antennas 20. This is referred to as a "combined channel estimate" and connotes that the estimate is really based on training sequence information received in the combined signal from one or more antennas 20 during the time interval.

These combined channel estimates are summed across all times slots M for each antenna i using the scaling value matrix elements from the column corresponding to the $i^{th}$ antenna for the $l^{th}$ multipath, which is described in detail below. That is, the sets of multipliers 102 corresponding to the combiners 104 operate to scale each combined channel estimate by the appropriate set of scaling values corresponding to the scaling values used to scale transmission of the known training sequence over the M times slots at a corresponding one of the transmit antennas 20. Thus, each combiner 104 corresponds to a different one of the transmit antennas 20. The outputs from the combiners 104 represent the antenna-specific channel estimates for one or more multipaths l for each of the N transmit antennas 20. Note that in the DSP 80, the same processing resources could be used repeatedly to perform the estimation, scaling, and summing operations performed by the estimators 100, multipliers 102, and combiners 104 illustrated in FIG. 7.

The above operations sum the combined channel estimates for all time intervals, with each combined time interval estimate scaled by the scaling value matrix element in the $i^{th}$ column and the $k^{th}$ row. In detail, let $b_{ij}$ denote the matrix element in the $i^{th}$ row and in the $j^{th}$ column of any scaling value matrix B of dimension M×N with orthogonal columns, where M≧N. In other words, $\{b_{ij}\}$ satisfies, $$\sum_{k=1}^{N} b_{ki}^* b_{kj} = \delta(i-j),$$

for i=1,2, . . . , M time intervals and j=1,2, . . . , N transmit antennas 20. Further, let $\{s(n)\}_{n=0}^{M-1}$ be a training sequence such as might be normally used in a communication system with no transmit diversity (i.e., with a single transmit antenna). By selecting the corresponding matrix element from the scaling value matrix, the training sequence may be scaled and signed so that the receiver 70 in the AT 30 can discriminate between the antennas 20. The scaled training sequence $\{b_{kj} s(n)\}_{n=0}^{M-1}$ is transmitted by the $j^{th}$ antenna during the training period of the $k^{th}$ time interval, where j=1,2, . . . , N and k=1,2, . . . , M.

At the receiver 70 of the AT 30, the received signal r in time interval k may be written as, $$r_k(n) = \sum_{j=1}^{N} \sum_{l=0}^{L-1} h_j(l)[b_{kj}s(n-l)] + w_k(n) = \sum_{l=0}^{L-1} \underbrace{\left[\sum_{j=1}^{N} b_{kj} h_j(l)\right]}_{h'_k(l)} s(n-l) + w_k(n).$$

Where $\{h'_k(l)\}_{l=0}^{L-1}$ is the effective channel response observed in the time interval k and $w_k(n)$ represents an unknown noise component in the time interval k. Note that the inner summation from l=0 to L−1 represents a summation of the set of propagation paths for a given antenna j, while the outer summation from j=1 to N spans the full set of transmit diversity antennas 20. Without loss of generality, it is assumed that the channel responses from all the antennas 20 have length L.

As depicted in FIG. 7, to obtain a channel estimate for each of the transmit antennas 20, the joint channel estimator 78 first performs a channel estimation for the effective channel $\{h'_k(l)\}_{l=0}^{L-1}$ in each time interval k as if there were only one transmit antenna 20. A channel estimate $\{\hat{h}_i(l)\}_{l=0}^{L-1}$ for each antenna i can then be obtained by combining the channel estimates $\{\hat{h}'_k(l)\}_{l=0}^{L-1}$ from all M time intervals as follows, $$\hat{h}_i(l) = \sum_{k=1}^{M} b_{ki}^* \hat{h}_k'(l),$$

where l=0,1, . . . , L−1 and i=1,2, . . . , N. Note that the conjugate of the transmit scaling factors are generally used by the AT 30 in the above calculation. Ignoring the noise component, the estimate $\{\hat{h}'_k(l)\}_{l=0}^{L-1}$ of the effective channel in each time interval k is then given by $$\hat{h}_k'(l) = h_k'(l) = \sum_{j=1}^{N} b_{kj} h_j(l).$$

Then, from the above equation, the channel estimate for antenna i reduces to $$\hat{h}_i(l) = \sum_{k=1}^{N} b_{ki}^* \hat{h}_k'(l) = \sum_{k=1}^{M} b_{ki}^* \sum_{j=1}^{N} b_{kj} h_j(l) = \sum_{j=1}^{N} \underbrace{\left[\sum_{k=1}^{M} b_{ki}^* b_{kj}\right]}_{\delta(i-j)} h_j(l) = h_i(l),$$

For l=0,1, . . . , L−1 and i=1,2, . . . , N, which is the true channel response for antenna i.

As a general summary of the above details, the AT 30 operates in a wireless communication network that uses transmit diversity, and receives the same training sequence from two or more antennas over two or more time intervals. If there are N transmit antennas 20, the AT 30 must receive the transmitted scaled training sequence simultaneously transmitted from the N transmit antennas over at least M time intervals, where M≧N. A sequence of scaling values, one value per time interval, is used to scale the training sequence across the time intervals for each antenna 20. As between the multiple transmit antennas 20, the scaling sequences used are orthogonal. It may be that, for one or more antennas 20 in one or more time intervals, the corresponding scaling value is zero, which effectively suppresses transmission of the training sequence from that antenna for that time interval.

In any case, because the overall scaling sequences used across the full set of time intervals between the antennas 20 are orthogonal, the AT 30 can perform channel estimation in each time interval based on the combined signal received from all antennas 20 transmitting the training sequence in that time interval. After developing a combined channel estimate for each of the time intervals, the AT 30 can, for each antenna 20, scale each combined channel estimate using the same scaling value used to scale the training sequence from that antenna 20 in that time interval. In effect, the AT 30 is, for each antenna 20, weighting the set of combined channel estimates by the corresponding set or sequence of scaling values. Each weighted set of combined channel estimates may be summed to obtain antenna-specific training sequence information.

Because of the orthogonality between the sequences used by each antenna 20, weighting the set of combined channel estimates with a particular sequence of scaling values cancels the influence of training sequences transmitted from all but the individual antenna 20 that used that particular scaling sequence in transmission. Thus, the AT 30 is left with training sequence data corresponding to a specific one of the antennas 20, and can therefore develop an antenna-specific channel estimate for the one or more propagation paths or multipaths l between that specific antenna 20 and the AT 30. Repeating this process by weighting the set of combined channel estimates using each of the scaling value sequences allows the AT 30 to develop a weighted sum of combined channel estimates for each antenna 20, and thereby obtain an antenna-specific channel estimate for each one of the multiple transmit antennas 20.

Another way of representing the generalized operations involved is to refer back to the scaling value matrix discussed earlier. This matrix has orthogonal columns; with each column corresponding to one of the N transmit antennas 20, and each row corresponding to one of the M time intervals. Each column represents a scaling value sequence, with successive values in the scaling value sequence representing the scaling values used at the corresponding transmit antenna 20 over the set or sequence of M time intervals. Thus, on the transmit side, each transmit antenna 20 transmits the training sequence at each one of the M time intervals scaled by the corresponding scaling value in the scaling value sequence (matrix column) corresponding to that transmit antenna 20. At the AT 30, the combined channel estimates are determined for each of the M time intervals, and then combined in weighted fashion for each transmit antenna 20 using the same scaling value sequence (matrix column) used to scale the transmitted training sequence.

The number of time intervals M may be a multiple of the number N of transmit antennas 20 involved. For example, if there are two transmit antennas 20 (N=2), then c×N time intervals may be used, where "c" is some number such that the total number of time intervals M is a multiple of N. If, for example, with N=2 and c=2, a total of four time intervals are used (M =4). This provides the AT 30 with an opportunity to develop a antenna-specific channel estimates based on longer averages, which may yield greater estimate accuracy provided the channels are not changing too rapidly.

As a practical illustration of the above general formulation with N transmit antennas 20 and M time intervals, the earlier examples with N=2 antennas and M=2 time intervals are revisited. First, consider a two-antenna example in which the scaling value matrix B is formed as the identity matrix $b_{11}=b_{22}=1$ and $b_{12}=b_{21}=0$. This assumes using, for example antennas A1 and A2 from the antennas 20 depicted in FIG. 1. In this case, the training sequence $\{s(n)\}_{n=0}^{M-1}$ is transmitted at full power over the first antenna A1 during the training period of the first time interval while the second antenna A2 is kept silent (i.e. it transmits nothing). During the second time interval, the first antenna A1 is kept silent while the second antenna A2 transmits the training sequence $\{s(n)\}_{n=0}^{M-1}$. The joint channel estimator 78 estimates the channels for the first and the second antennas A1 and A2 from the received signal r in the first and second time intervals, respectively. Note that keeping a transmit antenna 20 silent during a time slot or interval may be accomplished by scaling the training information it transmits by a zero scaling value.

Another two-antenna example is based on forming a "sum-difference" scaling value matrix B as, $$B = \begin{bmatrix} \frac{1}{\sqrt{2}} & \frac{1}{\sqrt{2}} \\ \frac{1}{\sqrt{2}} & -\frac{1}{\sqrt{2}} \end{bmatrix}.$$

In this case, both antennas A1 and A2 transmit the training sequence $\{2^{-1/2}s(n)\}_{n=0}^{M-1}$ during the training period of the first time interval. In the second time interval, the first antenna A1 transmits $\{2^{-1/2}s(n)\}_{n=0}^{M-1}$ while the second antenna A2 transmits $\{-2^{-1/2}s(n)\}_{n=0}^{M-1}$. The joint channel estimator 78 obtains channel estimates for the two antennas A1 and A2, given as $\{\hat{h}_1(l)\}_{l=0}^{L-1}$ and $\{\hat{h}_2(l)\}_{l=0}^{L-1}$, respectively, by computing, $$\hat{h}_1(l) = \frac{\hat{h}'_1(l) + \hat{h}'_2(l)}{\sqrt{2}} \text{ and } \hat{h}_2(l) = \frac{\hat{h}'_1(l) + \hat{h}'_2(l)}{\sqrt{2}}, \text{ for } l = 0, 1, \ldots, L-1.$$

Where $\{\hat{h}'_1(l)\}_{l=0}^{L-1}$ and $\{\hat{h}'_2(l)\}_{l=0}^{L-1}$ denote the estimated channels for the first and second time intervals, respectively.

In general, the columns of the scaling value matrix B are adjusted to normalize the relative power levels of the transmit signal transmitted from each of the antennas 20. For example, a 3×3 matrix with the requisite columnar orthogonality is given as, $$B = \begin{bmatrix} 2 & 1 & 0 \\ 1 & -1 & 0.5 \\ 1 & -1 & -0.5 \end{bmatrix}.$$

The above matrix may be normalized to achieve the desired relative transmit power levels between the three transmit antennas 20 for each of the three time intervals as, $$B = \begin{bmatrix} \frac{2}{\sqrt{6}} & \frac{1}{\sqrt{3}} & 0 \\ \frac{1}{\sqrt{6}} & \frac{-1}{\sqrt{3}} & \frac{\sqrt{2}}{2} \\ \frac{1}{\sqrt{6}} & \frac{-1}{\sqrt{3}} & \frac{-\sqrt{2}}{2} \end{bmatrix}.$$

As shown above, the joint channel estimation techniques of the present invention allow a single training sequence to be used in transmit diversity environments with any number of antennas 20. In practice, the number of antennas 20 is typically limited to a relatively small number (e.g., N<8) for a variety of reasons. First, adding more and more transmit antennas 20 becomes a diminishing returns problem. That is, increasing from, for example, three antennas 20 to four antennas 20 does not yield the same percentage increase in performance achieved by going from one antenna 20 to two antennas 20. Further, it takes as least as many time intervals as there are transmit antennas 20 to perform joint channel estimation.

Joint channel estimation techniques work best when the channels being estimated are not changing rapidly. Thus, as noted earlier, using more transmit antennas 20 extends the number of time intervals and hence increases the overall time required to develop the set of channel estimates $$\{\hat{c}_j\}_{j=1}^{j=N}$$

for the N transmit antennas 20 (M≧N).

The present invention was illustrated in the particular context of a GSM-based TDMA wireless communication system. However, it broadly applies to TDMA systems in general, as well as applying equally well to CDMA-based communication systems in general. Thus, the mobile network 10 may be configured as a CDMA-based wireless communication system and the AT 30 may be appropriately configured to operate with the appropriate CDMA air interface.

Two types of training are typically used in CDMA communication systems. The first type or variety of training is based on "pilot symbols," and is essentially the same as the training sequence method used in TDMA systems, as discussed above. In the pilot symbol approach, blocks of information are interspersed with known pilot symbols. Thus, these pilot symbols in the CDMA environment correspond to the training sequences used in the TDMA environment, and the present invention may be applied directly to CDMA systems employing such pilot symbols.

The second type or variety of training in CDMA environments involves the use of a pilot channel. A pilot channel is transmitted simultaneously the information (e.g., a traffic channel). Different spreading codes are used between the pilot and traffic channels. The orthogonality between the different spreading sequences allows an AT 30 to differentiate the pilot channel from the other channels, provided the time dispersion over the physical medium (propagation channels) is not too great. Generally, the design of the CDMA-based system works to limit dispersion to tolerable limits.

The present invention applies to the use of pilot channels as well. The spreading sequence transmitted over the pilot channel plays the role of the training sequence used in TDMA-based applications. Consequently, the same technique is applied to the pilot channels transmitted from different transmit antennas 20. As CDMA systems are typically continuous transmission systems, the pilot channel may be partitioned into blocks of time, in analogous manner to the time slot division approach used in TDMA systems.

With the pilot channel being time-partitioned, the present invention may be applied as before, using N antennas 20 and M time blocks of the pilot channel. For example, with two transmit antennas 20 and two pilot channel time blocks, the same training sequence may be transmitted over both pilot channels (the pilot channel from each one of the two transmit antennas) for one time block, and the antipodal sequences transmitted from the antennas 20 over the pilot channels for the next time block. This operation mimics the earlier TDMA-based examples.

Note that some CDMA systems use a scrambling mask after spreading. Scrambling helps randomize the signals, to the benefit of the system. Typically, the same scrambling mask is used by all signals transmitted from one communication sector or cell. The signals from all N transmit antennas 20 are treated as coming from the same sector or cell. Hence, the signals from the N antennas 20 all use the same scrambling mask.

At the receiver (e.g., the AT 20), the scrambling mask is removed from the composite received signal, thus unscrambling all the components of the composite signal simultaneously received from the different transmit antennas 20. Thus, the use of scrambling masks with in CDMA environments does not interfere with the use of the present invention. Other aspects of CDMA communication systems, including channel estimation in the context of RAKE receivers, are well understood in the art and do not require discussion in the context of the present invention.

The above discussion included examples for applying the present invention to both TDMA and CDMA communication systems. It should be appreciated that the present invention may, of course, be carried out in other specific ways than those herein set forth with out departing from the spirit and essential characteristics of the invention. The present embodiments are, therefore, to be considered in all respects as illustrative and not restrictive, and all changes coming with in the meaning and equivalency range of the appended claims are intended to be embraced therein.

What is claimed is:

1. A method of facilitating mobile receiver propagation channel estimation based on a common training sequence in a transmit diversity environment wherein two or more transmit antennas simultaneously transmit data to the mobile receiver, the method comprising:

transmitting scaled versions of a single training sequence simultaneously from each one of the two or more transmit antennas during each one of two or more time intervals; and scaling the single training sequence for each time interval and at each antenna by a scaling value selected from an orthogonal set of scaling values based on the antenna and the time interval, such that the mobile receiver can distinguish the single training sequence as received from each of the two or more antennas by combining the scaled single training sequences received over the two or more time intervals.

2. The method of claim 1 wherein transmitting scaled versions of a single training sequence simultaneously from each one of the two or more transmit antennas during each one of two or more time intervals comprises, for each time interval and transmit antenna, adjusting a transmit power used to transmit the scaled version of the single training sequence based on a magnitude of the corresponding scaling value.

3. The method of claim 2 wherein adjusting a transmit power used to transmit the scaled version of the single training sequence based on a magnitude of the corresponding scaling value comprises not transmitting the common training sequence from a given one of the two or more transmit antennas for a given one of the two or more time intervals if the corresponding scaling value has a magnitude of zero.

4. The method of claim 2 further comprising adjusting a sign of the transmit signal used to transmit the scaled version of the single training sequence based on a sign of the corresponding scaling value.

5. The method of claim 1 further comprising maintaining the set of orthogonal scaling values as a matrix having orthogonal columns, and wherein each column corresponds to one of the two or more transmit antennas and each row of the matrix corresponds to one of the two or more time intervals.

6. The method of claim 1 wherein there are two transmit antennas and two time intervals used for training, and wherein scaling the single training sequence for each time interval and at each antenna by a scaling value selected from an orthogonal set of scaling values based on the antenna and the time interval comprises:

scaling the single training sequence for transmission by a first one of the two transmit antennas by a first scaling factor during each one of the two time intervals; and scaling the single training sequence for transmission by a second one of the two transmit antennas by the first scaling factor during the first time interval, and by the negative of the first scaling factor during the second time interval, such that the second one of the two transmit antennas transmits an antipodal version of the single training sequence during the second time interval.

7. The method of claim 1 wherein there are two transmit antennas and two time intervals used for training, and wherein scaling the single training sequence for each time interval and at each antenna by a scaling value selected from an orthogonal set of scaling values based on the antenna and the time interval comprises:

scaling the single training sequence for transmission by a first one of the two transmit antennas by a first scaling factor during a first one of the two time intervals, and by zero during the second one of the two time intervals; and scaling the single training sequence for transmission by a second one of the two transmit antennas by zero during the first time interval, and by the first scaling factor during the second time interval.

8. The method of claim 1 wherein there are a number N transmit antennas and a number M time intervals, where M>N, and wherein scaling the single training sequence for each time interval and at each antenna by a scaling value selected from an orthogonal set of scaling values based on the antenna and the time interval comprises selecting a corresponding matrix element for each antenna at each time interval from a scaling value matrix comprising N orthogonal columns corresponding to the N transmit antennas and M rows corresponding to the M time intervals.

9. The method of claim 1 further comprising maintaining a relative scaling of the single training sequence between the two or more transmit antennas such that a total transmit power of the scaled versions transmitted from the two or more antennas remains at a desired total transmit power P.

10. The method of claim 1 wherein the mobile receiver is a TDMA receiver and wherein transmitting scaled versions of a single training sequence simultaneously from each one of the two or more transmit antennas during each one of two or more time intervals comprises transmitting scaled versions of the single training sequence during a training portion of two or more successive TDMA time slots.

11. The method of claim 1 wherein the mobile receiver is a CDMA receiver using pilot symbols to perform propagation channel estimation, and wherein transmitting scaled versions of a single training sequence simultaneously from each one of the two or more transmit antennas during each one of two or more time intervals comprises transmitting scaled versions of the same pilot symbols.

12. The method of claim 1 wherein the mobile receiver is a CDMA receiver using a pilot channel to perform propagation channel estimation, and wherein transmitting scaled versions of a single training sequence simultaneously from each one of the two or more transmit antennas during each one of two or more time intervals comprises:

dividing the pilot channel time wise into two or more succeeding blocks of time;

transmitting scaled versions of a pilot channel sequence from each one of the two or more transmit antennas for each one of the two or more blocks of time.

13. A method of transmitting from at least two transmit antennas to achieve transmit diversity between a wireless communication system and a mobile receiver, the method comprising:

transmitting the same training sequence from said at least two transmit antennas during each one of at least two time intervals; and scaling the training sequence transmitted at each said transmit antenna during each said time interval by a scaling factor selected from an orthogonal set of scaling factors based on said antenna and said time interval;

wherein using said scaling factors to adjust the training sequence transmitted by each antenna in each time interval allows the mobile receiver receiving a combined signal from said at least two transmit antennas for said at least two time intervals to develop propagation channel estimates relative to each one of said transmit antennas.

14. The method of claim 13 wherein scaling the training sequence transmitted at each said transmit antenna during each said time interval by a scaling factor selected from an orthogonal set of scaling factors based on said antenna and said time interval comprises:
- providing a scaling value matrix comprising a column for each one of said two or more transmit antennas and a row for each one of said at least two time intervals, wherein said columns are orthogonal with respect to each other; and
- scaling said training sequence at a jth one of the antennas in a kth one of the time intervals by the matrix element in the corresponding kth row and the corresponding jth column of said scaling value matrix.

15. The method of claim 14 wherein said scaling value matrix has a number N columns corresponding to N transmit antennas and a number M rows corresponding to M time intervals, where M is greater than or equal to N, and further comprising:
- setting a nominal transmit power for each of said N transmit antennas as a 1/N fraction of the desired total transmit power; and
- normalizing said scaling value matrix based on said nominal transmit power.

16. The method of claim 14 wherein scaling said training sequence at a jth one of the antennas in a kth one of the time intervals by the matrix element in the corresponding kth row and the corresponding jth column of said scaling value matrix comprises multiplying a transmit signal from said jth antenna in the kth time interval by said matrix element in the kth row and jth column in said scaling value matrix.

17. The method of claim 13 further comprising determining said orthogonal set of scaling values to minimize transmit power changes in the transmitted signal from said transmit antennas between successive time intervals.

18. A method of developing channel estimates at a mobile receiver operating in a wireless communication system that employs transmit diversity, the method comprising:
- receiving the same training sequence from at least two transmit antennas in each of at least two time intervals;
- generating a combined channel estimate in each said time interval based on receiving the training sequence from said at least two transmit antennas; and
- generating a channel estimate for each said transmit antenna as a weighted combination of the combined channel estimates;
- wherein the weighting factors used to generate said weighted combination of combined channel estimates for each said transmit antenna correspond to a sequence of scaling factors used to scale said training sequence at said transmit antenna over said time intervals, and wherein said sequences of scaling factors used for the at least two transmit antennas are orthogonal sequences.

19. The method of claim 18 wherein generating a combined channel estimate in each said time interval based on receiving the training sequence from said at least two transmit antennas comprises:
- receiving a combined signal from said at least two transmit antennas; and
- generating a channel estimate based on the combined signal for each time interval as if there were only one transmit antenna active in each said time interval.

20. The method of claim 19 wherein generating a channel estimate based on the combined signal for each time interval as if there were only one transmit antenna active in each said time interval comprises, for at least one multipath component received during said time interval, determining a channel estimate based on distortion in received values corresponding to said training sequence.

21. The method of claim 19 wherein generating a channel estimate for each said transmit antenna as a weighted combination of the combined channel estimates comprises, for each said transmit antenna, multiplying the combined channel estimate determined in each time interval by a scaling factor corresponding to said time interval, wherein said scaling factor is selected from the sequence of scaling factors used to scale the training sequence transmitted by said transmit antenna over said time intervals.

22. A method of channel estimation in a wireless communication system employing transmit diversity, the method comprising:
- receiving a training sequence transmitted from a plurality of transmit antennas during each one of a plurality of time intervals, wherein each said transmit antenna scales the transmitted training sequence in each said time interval using a corresponding scaling value selected from orthogonal sets of scaling values;
- generating a combined channel estimate for each time interval based on said training sequence as received from said plurality of transmit antennas in said time slot; and
- generating a channel estimate relative to each transmit antenna based on:
  - weighting each combined channel estimate by the corresponding scaling value selected from said sets of orthogonal scaling values based on said antenna and said time interval; and
  - summing weighted combined channel estimates to form said channel estimate relative to said transmit antenna.

23. The method of claim 22 wherein said combined channel estimates developed across said time intervals form a sequence of combined channel estimates and wherein weighting said combined channel estimates for each transmit antenna comprises multiplying respective ones in said sequence of combined channel estimates by the complex conjugates of respective ones of said corresponding scaling values used by said transmit antenna.

24. The method of claim 22 wherein each said combined channel estimate comprises a composite of combined estimates for a number of multipath signals and further comprising generating said channel estimate relative to each said transmit antenna based on weighting and summing said composites of combined estimates.

25. The method of claim 22 further comprising storing in a wireless receiver said sets of orthogonal scaling values used by said plurality of transmit antennas to scale said training sequence across said plurality of time intervals.

26. The method of claim 22 wherein said plurality of times intervals is a desired multiple of the number of said plurality of transmit antennas.

27. A method of performing channel estimation at a mobile receiver in a wireless communication system employing at least two transmit antennas to achieve transmit diversity, the method comprising:
- receiving a training sequence in a received signal transmitted from a plurality of transmit antennas in each one of a plurality of time intervals, said training sequence scaled at each said transmit antenna in each said time interval by a scaling value selected from a sequence of scaling values corresponding to said transmit antenna, and wherein said sequences of scaling values for said plurality of transmit antennas are mutually orthogonal;

generating a combined channel estimate for each time interval based on the training sequence received from said transmit antennas; and generating an antenna-specific channel estimate for each said transmit antenna based on:
   weighting each combined channel estimate by a scaling factor selected from the sequence of scaling factors corresponding to said transmit antenna based on the time interval corresponding to said combined channel estimate; and
   summing weighted combined channel estimates for all time intervals to form said antenna-specific channel estimate for said transmit antenna.

28. The method of claim 27 wherein generating a combined channel estimate for each time interval based on the training sequence received from said transmit antennas comprises generating a combined channel estimate in each said time interval for at least one multipath component of the received signal.

29. The method of claim 28 wherein generating a combined channel estimate in each said time interval for at least one multipath component of the received signal comprises generating an estimate of channel distortion for each one of the at least one multipath components of the received signal.

30. The method of claim 27 wherein weighting each combined channel estimate by a scaling factor selected from the sequence of scaling factors corresponding to said transmit antenna based on the time interval corresponding to said combined channel estimate comprises:
   for each combined channel estimate, selecting the corresponding scaling factor from the sequence of scaling factors corresponding to the transmit antenna; and
   multiplying each combined channel estimate by the conjugate of the corresponding scaling factor to generate a set of weighted combined channel estimates for the transmit antenna; and
   summing the set of weighted combined channel estimates to form the antenna-specific channel estimate for the transmit antenna.

31. The method of claim 27 further comprising:
   receiving the training sequence over said plurality of time intervals wherein said plurality of time intervals is a multiple of the number of transmit antennas; and
   determining a set of combined channel estimates for the plurality of time intervals, such that said antenna-specific channel estimates are averaged over the plurality of time intervals.

32. A wireless access terminal for use in a wireless communication system employing transmit diversity where two or more transmit antennas are used to transmit an information signal including a known training sequence over a plurality of time intervals, said access terminal comprising:
   a receiver front-end to generate a received signal based on receiving the information signal;
   a demodulator to generate a demodulated signal based on demodulating the received signal; and
   a joint channel estimator to compensate the received signal demodulated by said demodulator for channel distortions using antenna-specific channel estimates corresponding to the two or more transmit antennas, said joint channel estimator comprising:
      at least one combined channel estimator to determine a combined channel estimate for the received signal for each one of the plurality of time intervals;
      multipliers to generate scaled combined channel estimates for each one of the two or more transmit antennas by scaling the combined channel estimate determined for each time interval by a scaling factor corresponding to the time interval and the transmit antenna; and
      combining circuits to combine the scaled combined channel estimates corresponding to each one of the two or transmit antennas to form an antenna-specific channel estimate for each one of the two or more transmit antennas.

33. The wireless access terminal of claim 32 wherein said at least one combined channel estimator comprises channel estimation logic to determine a combined channel estimate for each time interval based on the received signal as received from the two or more transmit antennas.

34. The wireless access terminal of claim 32 wherein said wireless access terminal comprises a digital signal processor and said joint channel estimator comprises a portion of said digital signal processor.

35. The wireless access terminal of claim 32 further comprising memory operative to maintain said scaling factors used by said joint channel estimator to scale said combined channel estimates.

36. A transmitter for use in a wireless communication system using a plurality of transmit antennas to achieve transmit diversity, and further transmitting a common training sequence from all said transmit antennas, said transmitter comprising:
   a plurality of transmit amplifiers, each one of said plurality of transmit amplifiers corresponding to one of said multiple transmit antennas;
   a memory to hold a set of mutually orthogonal scaling sequences, each one of said scaling sequences corresponding to one of said transmit antennas and comprising a sequence of scaling values; and
   a controller to scale a transmit power of each one of said plurality of transmit amplifiers during each one of a plurality of successive time intervals by a scaling value selected based on time interval from the sequence of scaling values corresponding to each said transmit antenna.

37. The transmitter of claim 36 wherein said memory comprises a memory circuit containing said set of mutually orthogonal scaling sequences stored as a scaling value matrix with mutually orthogonal columns, each said mutually orthogonal column corresponding to one of said transmit antennas, and with a number of rows, successive ones of said rows corresponding to successive ones of said time intervals.

38. The transmitter of claim 37 wherein said controller comprises control circuitry for scaling a transmit signal from a jth one of said plurality of transmit antennas during a kth one of said plurality of successive time intervals by a scaling value selected from the corresponding jth column and the corresponding kth row of said scaling value matrix held in said memory.

39. The transmitter of claim 36 wherein said transmitter comprises a CDMA transmitter.

40. The transmitter of claim 36 wherein said transmitter comprises a TDMA transmitter.

* * * * *